United States Patent [19]
McCraney

[11] Patent Number: 5,971,336
[45] Date of Patent: Oct. 26, 1999

[54] WATER HEATER RESTRAINT

[76] Inventor: W. Jeffrey McCraney, 1918 W. Chestnut St., Santa Ana, Calif. 92703

[21] Appl. No.: 09/231,013

[22] Filed: Jan. 14, 1999

[51] Int. Cl.$^6$ .................................. A47K 1/08; F16L 3/08
[52] U.S. Cl. .......................... 248/313; 248/74.3; 248/154
[58] Field of Search ................................ 248/313, 216.1, 248/216.4, 546, 547, 201, 217.3, 154, 505, 74.3, 74.5, 68.1

[56] References Cited

U.S. PATENT DOCUMENTS

| | | | |
|---|---|---|---|
| 2,277,738 | 3/1942 | Wilkinson | 211/249 |
| 2,336,319 | 12/1943 | Tinnerman | 411/175 |
| 2,418,539 | 4/1947 | Anderson | 248/74.5 |
| 3,334,851 | 8/1967 | Cassidy et al. | 248/68.1 |
| 4,442,994 | 4/1984 | Logsdon | 248/74.3 |
| 4,955,573 | 9/1990 | Horvath | 248/313 |
| 5,190,260 | 3/1993 | Daubenspeck | 248/313 |
| 5,201,484 | 4/1993 | Thoen | 248/68.1 |
| 5,612,509 | 3/1997 | Market | 174/53 |

Primary Examiner—Derek J. Berger
Assistant Examiner—David Heisey
Attorney, Agent, or Firm—Edgar W. Averill, Jr.

[57] ABSTRACT

A water heater restraint for securing a vertical cylindrical water heater adjacent a wall. The restraint has an elongated strap surrounding the water heater and is secured to a wall by a pair of clamps which each have at least one hole. Each clamp guides one end of the elongated strap on its rear surface before fastening the end of the elongated strap to the wall by at least one fastener which extends through the hole(s), through the wall, and into wall studs behind the wall.

17 Claims, 2 Drawing Sheets

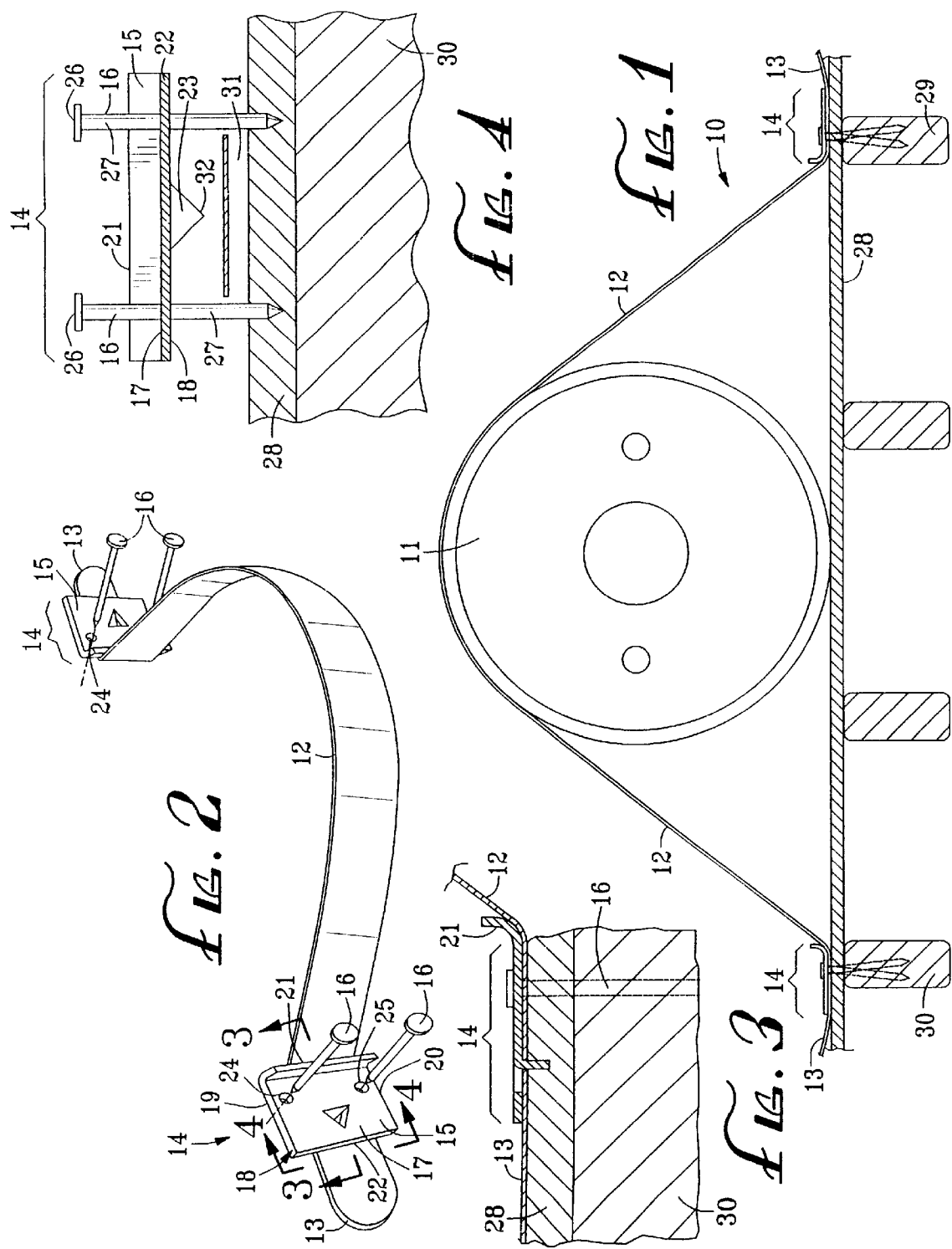

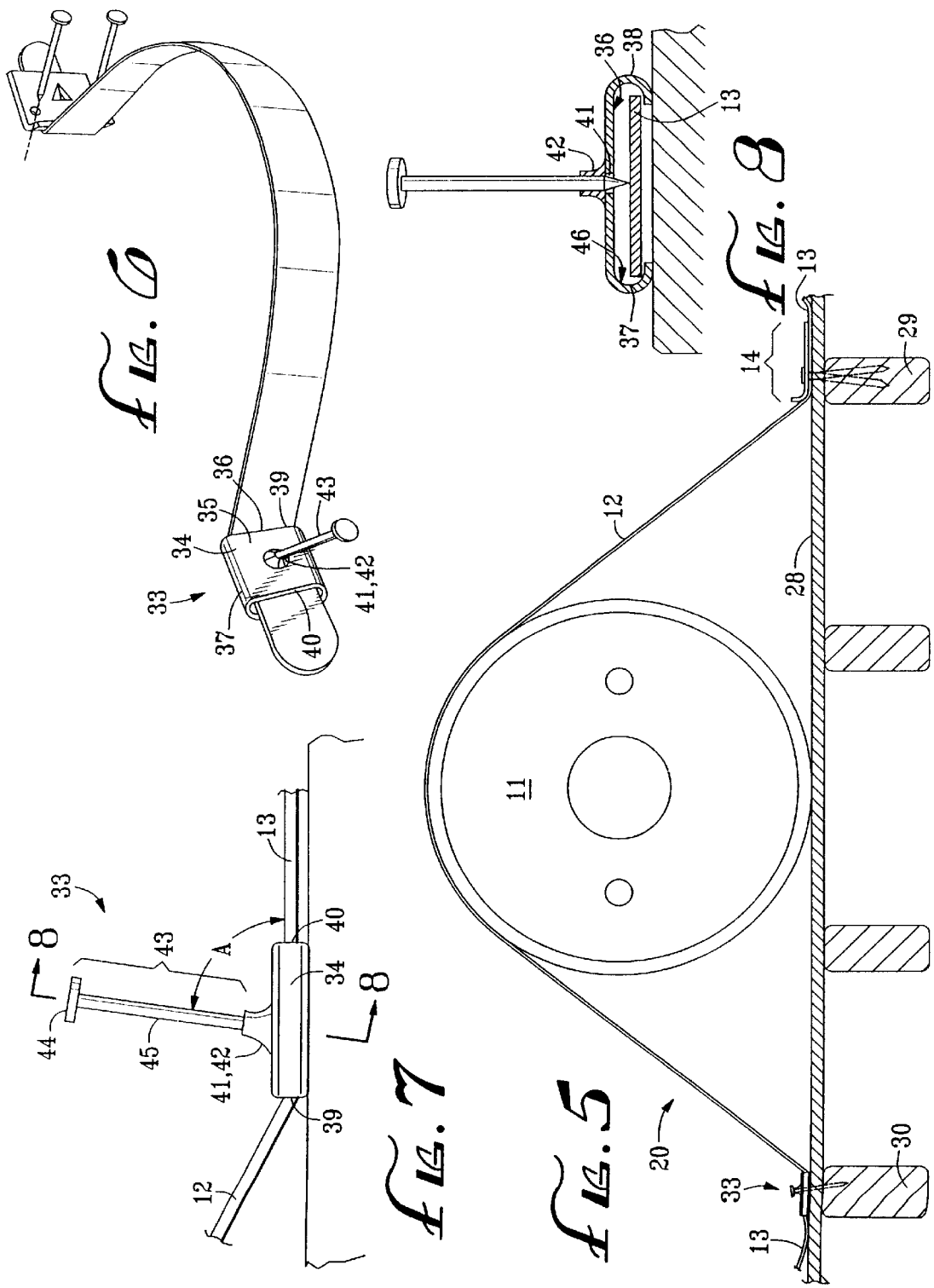

WATER HEATER RESTRAINT

BACKGROUND OF THE INVENTION

The field of the invention pertains to support brackets and fastener assemblies. The invention relates more particularly to support brackets and fastener assemblies used to brace-support vertically-oriented water heaters to the walls and wall studs of homes, commercial buildings, or the like. Such bracing-supporting protects a water heater against movement during an earthquake which may cause damage to the water heater as well as potentially cause fire or water damage from breakage in gas or water lines.

Water heaters have been brace-supported to walls and wall studs in a variety of ways to prevent lateral movement during an earthquake. One bracket is shown in U.S. Pat. No. 4,955,573 where a joint tie-strap having a plurality of holes is lag-bolted to wall studs behind a wallboard. A strap or outer collar surrounding a water heater and a second support are each independently tap-screwed to the joint tie-strap through the plurality of holes. In U.S. Pat. No. 5,020,760 a bracket assembly for holding a water heater in a corner is shown. U-shaped bracket mounting flanges are bolted to the corner walls, a bracket is bolted to the U-shaped bracket mounting flanges, and a belt surrounding the water heater is affixed to the bracket by independent means. In U.S. Pat. No. 5,190,260 a wooden beam is fastened to wall studs behind a wallboard. A pair of brackets is fastened to the wooden beam, and a strap is independently affixed to the pair of brackets. And finally U.S. Pat. No. 5,487,518 shows a water heater restraint for holding a water heater to wall studs behind a wallboard. A bi-channel strut is fastened to the wall studs behind the wallboard and a pair of slidably positionable gussets are fastened to the bi-channel strut. A strap surrounding the water heater is independently fastened to the slidably positionable gussets.

In all of the above prior disclosures, a first component is separately and independently fastened to a wall to serve as a mounting platform upon which all other components of the water heater bracing device are affixed. Most notably, a strap component which surrounds the water heater is fastened to the first component or a second component secured to the first component, but is not fastened directly to the wall itself. This use of a separately and independently fastened first component as a mounting platform for a strap component unnecessarily lengthens the installation time of existing bracing devices. It does so without significantly improving reliability, durability, and/or safety of the bracing devices. It also increases the production cost of existing bracing devices due to the greater number of parts involved. Currently, however, there is no effective, reliable, and economical device for securing a water heater directly to a wall and its supporting wall studs.

In addition, as indicated above, the means for fastening the first component directly to the wall has typically been with bolts or screw pieces. The use of bolts and screws, however, can be a time consuming and arduous process, especially for the non-professional installer. Instead, the use of a nail fastener which is pre-mounted in a piece to be fastened has been known to provide substantial benefits to the installation process.

As seen in U.S. Pat. No. 2,961,210 one embodiment of a pre-mounted fastener assembly shows a fastener which is preset at a ninety-degree angle in a conduit clip made of a deformable material. A second embodiment shows a fastener which is preset at a ninety-degree angle in an electrical box also made of a deformable material. However, the pre-mounted fastener assembly in this prior disclosure is designed primarily to prevent damaging thin sheets when fastened by an explosively driven nail. It does not particularly serve to shorten or facilitate the fastening process. More importantly, it does not contemplate or provide a means to optimally resist a known lateral force in a given direction in the piece to be fastened. Where such a force is known, a fastener would be able to provide greater resistance when fastened in a direction which forms an acute angle with the known force vector. This prior disclosure also does not provide for using a pre-mounted fastener in combination with a slidable strap for brace-supporting water heaters to walls.

In summary, there is a need for a simpler, less expensive, reliable, and easy-to-install water heater brace-supporting device which is positionable anywhere along a wall. Such a device is also needed to facilitate installation for many individuals having little or no mechanical or construction experience, while leaving little room for error and without sacrificing the quality of the installation. Additionally, the time saving benefits of including a pre-mounted fastener to facilitate the installation of water heater restraint devices have largely gone unrealized.

BRIEF SUMMARY OF THE INVENTION

It is an object of the present invention to provide a reliable and durable device for brace-supporting water heaters to walls and its supporting wall studs, and which can restrain water heaters from any lateral movement, particularly during an earthquake or other disaster so as to prevent water and gas lines from breaking and causing water or fire damage.

It is a further object of the present invention to provide a simple, low cost and easy-to-install device for brace-supporting water heaters which can be securely, durably, and safely installed by both professional and non-professional installers alike.

The present invention is for a water heater restraint for brace-supporting a vertically-oriented cylindrical water heater to a wall having a plurality of supporting wall studs. The water heater restraint has an elongated flexible member or strap surrounding any size water heater which may be securely tightened to prevent lateral movement. A pair of clamp assemblies guide each of the two ends of the elongated flexible member or strap through the respective clamp assembly during positioning and tightening. These clamp assemblies fasten each end of the elongated flexible member or strap directly to a wall stud.

BRIEF DESCRIPTION OF THE DRAWINGS

FIG. 1 is the top view partly in cross-section of the first preferred embodiment of the water heater restraint fully installed.

FIG. 2 is a perspective view of a first embodiment of the water heater restraint.

FIG. 3 is a cross-sectional view taken along the line of 3—3 of FIG. 2.

FIG. 4 is a side view partly in cross-section taken along the line of 4—4 of FIG. 2.

FIG. 5 is the top view in cross-section of a second embodiment of the water heater restraint fully installed.

FIG. 6 is a perspective view of the second embodiment of the water heater restraint.

FIG. 7 is a wall-level bottom view of the second clamp assembly of the second embodiment not fully installed.

FIG. 8 is a cross-sectional view taken along the line of 8—8 of FIG. 7.

DESCRIPTION OF THE PREFERRED EMBODIMENTS

Referring now to the drawings, FIG. 1 shows a top view partly in cross-section of the first embodiment of the water heater restraint indicated generally by reference character 10. An elongated flexible member 12 having a first surface 5, a second surface 6, a first edge 7, a second edge 8, and a pair of ends 13 surrounds a water heater 11 which is positioned against a wall 28. The wall 28 is supported by a plurality of wall studs, including wall studs 29 and 30. The pair of ends 13 of the elongated flexible member 12 is secured to the wall 28 at wall studs 29 and 30 by a pair of first clamp assemblies 14.

Details of the pair of first clamp assemblies 14 can be best seen in FIG. 2 which is a perspective view of the first embodiment 10. Each first clamp assembly 14 has a first clamp member 15 and a pair of fasteners 16. Each first clamp member 15 has a generally rectangular plate-like configuration with a front surface 17, a rear surface 18, a top edge 19, a bottom edge 20, a leading edge 21, a trailing edge 22, an upper hole 24 adjacent to the top edge 19, and a lower hole 25 adjacent to the bottom edge 20. The leading edges 21 are curved away from the wall studs 29 and 30 to reduce tensile stress where the elongated flexible member 12 contacts the leading edges 21. The curvature of the leading edge 21 is best shown in FIG. 3 which shows a cross-section taken along a line 3—3 of FIG. 2.

And as seen in FIG. 4, which shows a cross-sectional view taken along line 4—4 of FIG. 2, each fastener 16 has an enlarged head portion 26 and an elongated shank portion 27. The pair of elongated shank portions 27 extend through the upper hole 24 and the lower hole 25 from the front surface 17 and into the wall 28 and the wall studs 29 and 30. The pair of elongated shank portions 27 thus extended forms a guiding channel 31 for one end 13 of the elongated flexible member 12 to slide through during installation. Each end 13 is directly bounded along the first and second edges 7, 8 by the elongated shank portions 27, the elongated shank portions 27 being exposed to contact with at least one of the first and second edges 7, 8. A piercing portion 23 having a rigidly pointed tip 32 is formed from each first clamp member 15 on the rear surface 18. As can be seen in FIG. 3, after final installation, the piercing portions 23 of the first clamp members 15 pierces and penetrates through the elongated flexible member 12 at the ends 13 from the first surface 5, out through the second surface 6, and into the wall 28.

Installation of the first embodiment of the water heater restraint can be easily accomplished by any person, without the need for mechanical or construction skills or experience. First, two wall studs 29 and 30 are located behind the wall 28 and on either side of the water heater 11. This can be accomplished either by sound tapping with a hammer, or by using an electronic locating device. Second, a pair of first clamp members 15 are each partially fastened to the wall 28 and wall studs 29 and 30 with a pair of fasteners 16. Next, one end 13 of the elongated flexible member 12 is passed through the guiding channel 31 of one first clamp member 15 and securely fastened to wall stud 29. The elongated flexible member 12 is then wrapped around the water heater 11, and its remaining end 13 is passed through the guiding channel 31 of the remaining first clamp member 15. And after pulling the remaining end 13 to tighten the elongated flexible member 12, the remaining first clamp member 15 is securely fastened to wall stud 30.

FIG. 5 shows the top view partly in cross-section of the second embodiment, indicated generally by reference character 20. Similar to the first embodiment 10, the second embodiment 20 has an elongated flexible member 12 having a first surface 5, a second surface 6, a first edge 7, a second edge 8, and a pair of ends 13. The elongated flexible member 12 surrounds a water heater 11 which is adjacent a wall 28 supported by a plurality of wall studs, including wall studs 29 and 30. The elongated flexible member 12 is attached to wall stud 29 by a first clamp assembly 14 near one end 13, and to wall stud 30 by a second clamp assembly 33 near another end 13. The first clamp assembly 14 of the second embodiment 20 is the same as the first clamp assembly 14 of the first embodiment 10 in FIG. 2.

As can be seen in the perspective view in FIG. 6 of the second embodiment 20, the second clamp assembly 33 has a second clamp member 34 having a generally rectangular plate-like configuration. It has a front surface 35, a rear surface 36, a top edge 37, a bottom edge 38, a leading edge 39, a trailing edge 40, and a hole 41 which is surrounded by a raised collar 42. The second clamp assembly 33 also has a pre-mounted fastener 43 snugly positioned in the raised collar 42 and hole 41. As can be best seen in the wall-level bottom view of the second clamp assembly 33 in FIG. 7, the pre-mounted fastener 43 has an enlarged head portion 44 and an elongated shank portion 45. A portion of the elongated shank portion 45 is pre-mounted in the raised collar 42 and hole 41. FIG. 7 also shows best the raised collar 42 and the angle A between the pre-mounted fastener 43 and the front surface 35 of the second clamp member 34 at the trailing edge 40.

And as can be seen in FIG. 8, both the top edge 37 and the bottom edge 38 of the second clamp member 34 are curved around the rear surface 36 to form a double-grooved track 46. The double-grooved track 46 guides an end 13 of the elongated flexible member 12 therethrough.

Although not illustrated in a separate drawing, an additional third embodiment exists which comprises substantially the same elements as the second embodiment, but has a pair of second clamp assemblies instead of having one first clamp assembly and one second clamp assembly.

The result is a water heater restraint which may be easily installed and secured to a wall by individuals with little or no mechanical or construction experience and without special tools. Because the elongated flexible member is guided through the rear surface of the respective clamp assemblies before tightening and final securing, water heaters of different sizes can be accommodated. And since a first platform component and other bulky components are not needed, the water heater restraint packaging of the restraint requires only a minimal amount of space.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A water heater restraint for securing a vertical cylindrical water heater adjacent a wall, which wall is supported by a plurality of wall studs, said restraint comprising:

a pair of clamp assemblies, each clamp assembly comprising a clamp member having a generally rectangular plate-like configuration with a front surface, a rear surface, a top edge, a bottom edge, a leading edge, a trailing edge and at least one hole, and means for securing the clamp member directly to the wall studs by means of at least one fastener which passes through the hole and directly into the wall studs;

an elongated flexible member for surrounding the water heater, said elongated flexible member having a first surface, a second surface, a first edge, a second edge, and a pair of ends which are slidably positionable along the respective rear surface of said clamp members, each end extending along the respective rear surface of said clamp members from the leading edge to the trailing edge; and means for piercingly securing the elongated flexible member to the wall after finally positioning each end of said elongated flexible member against the respective rear surface of said clamp members, said means for piercingly securing the elongated flexible member piercing and penetrating through said elongated flexible member from the first surface, out through the second surface, and into the wall.

2. A water heater restraint as in claim 1, wherein each clamp member has an upper hole adjacent the top edge and a lower hole adjacent the bottom edge for mounting therethrough said means for securing said clamp members directly to the wall studs; and wherein said means for securing said clamp members to the wall studs comprises at least one pair of fasteners for each clamp member, each fastener having an elongated shank portion and an enlarged head portion, the elongated shank portions of said pair of fasteners extending through the upper hole and the lower hole from the front surface and driven securingly in the wall studs until the enlarged head portions abut against the front surface, the elongated shank portions of said pair of fasteners thereby forming therebetween a guiding channel for finally positioning each end of said elongated flexible member against the respective rear surface of said clamp members and wherein each end of said elongated flexible member is directly bounded along the first and second edges by the elongated shank portions, said elongated shank portions being exposed to contact with at least one of the first and second edges.

3. A water heater restraint as in claim 2, wherein said means for piercingly securing said elongated flexible member to the wall is a piercing portion integrally formed from the respective rear surface of said clamp members and having at least one rigidly pointed tip which projects inward towards the wall, said rigidly pointed tip extending sufficiently so that it may pierce and penetrate through said elongated flexible member from the first surface, out through the second surface, and into the wall when the rigidly pointed tip is fixedly driven toward the wall.

4. A water heater restraint as in claim 3, wherein each leading edge of said clamp members has a bend projecting the leading edge away from the wall studs, for minimizing tensile stress in said elongated flexible member where said elongated flexible member contacts the leading edges.

5. A water heater restraint as in claim 1, wherein said pair of clamp assemblies comprises:

a first clamp assembly comprising a first clamp member having an upper hole adjacent the top edge of the first clamp member and a lower hole adjacent the bottom edge of the first clamp member, and means for securing said first clamp member directly to the wall studs, said means for securing said first clamp member to the wall studs having at least one pair of fasteners, each fastener having an elongated shank portion and an enlarged head portion, the elongated shank portions of said pair of fasteners extending through the upper hole and the lower hole from the front surface until the enlarged head portions abut against the front surface of the first clamp member, the elongated shank portions of the pair of fasteners thereby forming therebetween a guiding channel for finally positioning one end of said elongated flexible member against the rear surface of the first clamp member, and wherein said one end of said elongated flexible member is directly bounded along the first and second edges by the elongated shank portions, said elongated shank portions being exposed to contact with at least one of the first and second edges; and a second clamp assembly comprising a second clamp member having one hole surrounded by a raised collar integrally formed on the front surface of said second clamp member, the top edge and the bottom edge of the second clamp member being curved around the rear surface of the second clamp member to form a double-grooved track having a generally C-shaped cross-section when viewed normal to said double-grooved track, the double-grooved track functioning as a guide for the elongated flexible member, and means for securing said second clamp member directly to the wall studs, said means for securing said second clamp member to the wall studs being a pre-mounted fastener having an elongated shank portion and an enlarged head portion, a portion of the elongated shank portion of said pre-mounted fastener being snugly pre-mounted into the hole of the second clamp member.

6. A water heater restraint as in claim 5, wherein said means for piercingly securing said elongated flexible member to the wall comprises means for piercingly securing the elongated flexible member to the wall at the first clamp assembly, said means for piercingly securing the elongated flexible member to the wall at the first clamp assembly being a piercing portion integrally formed from the rear surface of said first clamp member and having at least one rigidly pointed tip which projects inward towards the wall, said rigidly pointed tip extending sufficiently so that it may pierce and penetrate through said elongated flexible member from the first surface, out through the second surface, and into the wall when the rigidly pointed tip is fixedly driven towards the wall studs, and means for piercingly securing the elongated flexible member to the wall at the second clamp assembly, said means for piercingly securing the elongated flexible member to the wall at the second clamp assembly being the pre-mounted fastener.

7. A water heater restraint as in claim 6, wherein the leading edge of the first clamp member has a bend, said bend projecting the leading edge of the first clamp member away from the wall studs, for minimizing tensile stress in said elongated flexible member where said elongated flexible member contacts the leading edge of the first clamp member.

8. A water heater restraint as in claim 7, wherein the hole surrounded by the raised collar of the second clamp member has a central axis having an angle less than ninety degrees from the front surface of the second clamp member at the trailing edge of the second clamp member, whereby the pre-mounted fastener has a "toe-in" configuration for durably securing said elongated flexible member and said second clamp member to the wall studs.

9. A water heater restraint as in claim 1, wherein each clamp member has one hole surrounded by a raised collar integrally formed on the front surface, for mounting therethrough said means for securing said clamp members directly to the wall studs;

wherein said means for securing said clamp members directly to the wall studs comprises a pre-mounted fastener for each clamp member, said pre-mounted fastener having an elongated shank portion and an enlarged head portion, a portion of the elongated shank portion of the pre-mounted fastener being snugly pre-mounted in the respective hole of the clamp members;

wherein said means for piercingly securing said elongated flexible member to the wall comprises said pre-mounted fastener; and wherein the top edge and the bottom edge of said clamp members are curved around the respective rear surface of said clamp members to form a double-grooved track having a generally C-shaped cross-section when viewed normal to said double-grooved track, said double-grooved track functioning as a guide for the elongated flexible member.

10. A water heater restraint as in claim 9, wherein the hole of each clamp member has a central axis having an angle less than ninety degrees from the respective front surface of the clamp members at the respective trailing edge of the clamp members, whereby the pre-mounted fastener has a "toe-in" configuration for durably securing said elongated flexible member and said clamp members to the wall studs.

11. A water heater restraint for securing a vertical cylindrical water heater adjacent a wall, which wall is supported by a plurality of wall studs, said restraint comprising:

a pair of clamp assemblies, each clamp assembly comprising a clamp member having a generally rectangular plate-like configuration with a front surface, a rear surface, a top edge, a bottom edge, a leading edge, a trailing edge, an upper hole adjacent the top edge and a lower hole adjacent the bottom edge, and means for securing the clamp member directly to the wall studs, said means for securing the clamp member to the wall studs comprising at least one pair of fasteners for each clamp member, each fastener having an elongated shank portion and an enlarged head portion, the elongated shank portions of said pair of fasteners extending through the upper hole and the lower hole from the front surface and driven securingly into the wall studs until the enlarged head portions abut against the front surface, the elongated shank portions of the pair of fasteners thereby forming a guiding channel therebetween;

a strap for surrounding the water heater, said strap having a first surface, a second surface, a first edge, a second edge, and a pair of ends which are slidably positionable through the respective guiding channel adjacent the respective rear surface of said clamp members from the leading edge to the trailing edge wherein each end of said strap is directly bounded along the first and second edges by the elongated shank portions; and means for piercingly securing said strap to the wall after finally positioning each end of said strap against the respective rear surface of said clamp members, said means for piercingly securing said strap piercing and penetrating through said strap from the first surface, out through the second surface, and into the wall.

12. A water heater restraint as in claim 11, wherein said means for piercingly securing said strap to the wall is a piercing portion integrally formed from the respective rear surface of said clamp members and having at least one rigidly pointed tip which projects inward towards the wall, said rigidly pointed tip extending sufficiently so that it may pierce and penetrate through said strap from the first surface, out through the second surface, and into the wall when the rigidly pointed tip is fixedly driven into the wall.

13. A water heater restraint as in claim 12, wherein each leading edge of said clamp members has a bend, each bend projecting the respective leading edge away from the wall studs, for minimizing tensile stress in said strap where said strap contacts the leading edges.

14. A water heater restraint for securing a vertical cylindrical water heater adjacent a wall, which wall is supported by a plurality of wall studs, said restraint comprising:

a first clamp assembly comprising a first clamp member having a generally rectangular plate-like configuration with a front surface, a rear surface, a top edge, a bottom edge, a leading edge, a trailing edge, an upper hole adjacent the top edge and a lower hole adjacent the bottom edge, and means for securing the first clamp member directly to the wall studs, said means for securing the first clamp member to the wall studs comprising at least one pair of fasteners, each fastener having an elongated shank portion and an enlarged head portion, the elongated shank portions of said pair of fasteners extending through the upper hole and the lower hole from the front surface and driven securingly into the wall studs until the enlarged head portions abut against the front surface, the elongated shank portions of the pair of fasteners thereby forming a guiding channel therebetween;

a second clamp assembly comprising a second clamp member having a generally rectangular plate-like configuration with a front surface, a rear surface, a top edge, a bottom edge, a leading edge, and a trailing edge, with the top edge and the bottom edge of said second clamp member being bent around the rear surface to form a double-grooved track having a generally C-shaped cross-section when viewed normal to the double-grooved track, the second clamp member having one hole surrounded by a raised collar integrally formed on the front surface of the second clamp member, and means for securing said second clamp member directly to the wall studs comprising a pre-mounted fastener, said pre-mounted fastener having an elongated shank portion and an enlarged head portion, a portion of the elongated shank portion of the pair of fasteners being snugly pre-mounted in the hole of the second clamp member;

a strap for surrounding the water heater, said strap having a first surface, a second surface, a first edge, a second edge, a first end, and a second end, the first end being slidably positionable through the guiding channel adjacent the rear surface of the first clamp member from the leading edge to the trailing edge wherein the first end is directly bounded along the first and second edges by the elongated shank portions of the pair of fasteners, and the second end being slidably positionable along the double-grooved track adjacent the rear surface of the second clamp member from the leading edge to the trailing edge;

means for piercingly securing the first end of said strap to the wall after finally positioning the first end of said strap through the guiding channel adjacent the rear surface of said first clamp member; and means for piercingly securing the second end of said strap to the wall after finally positioning the second end of said strap along the double-grooved track adjacent the rear surface of said second clamp member, said means for piercingly securing the second end of said strap to the wall being the pre-mounted fastener.

15. A water heater restraint as in claim 14, wherein said means for piercingly securing the first end of said strap to the wall is a piercing portion integrally formed from the rear surface of said first clamp member and having at least one rigidly pointed tip which projects inward towards the wall, said rigidly pointed tip extending sufficiently so that it may pierce and penetrate through said strap from the first surface, out through the second surface, and into the wall when the rigidly pointed tip is fixedly driven into the wall.

16. A water heater restraint as in claim 15, wherein the leading edge of the first clamp member has a bend projecting the leading edge of the first clamp member away from the wall studs, for minimizing tensile stress in said strap where said strap contacts the leading edge of the first clamp member.

17. A water heater restraint as in claim 16, wherein the hole surrounded by the raised collar of the second clamp member has a central axis having an angle less than ninety degrees from the front surface at the trailing edge, whereby the pre-mounted fastener has a "toe-in" configuration for durably securing said strap and said second clamp member to the wall studs.

\* \* \* \* \*